United States Patent [19]
Christiansen et al.

[11] Patent Number: 5,983,302
[45] Date of Patent: Nov. 9, 1999

[54] METHOD AND APPARATUS FOR ARBITRATION AND ACCESS TO A SHARED BUS

[75] Inventors: Kevin M. Christiansen, Saratoga; Mark A. Stubbs, Felton; Bruce Eckstein, Cupertino, all of Calif.

[73] Assignee: Apple Comptuer, Inc., Cupertino, Calif.

[21] Appl. No.: 09/104,401

[22] Filed: Jun. 25, 1998

Related U.S. Application Data

[63] Continuation of application No. 08/437,233, May 8, 1995, Pat. No. 5,787,264.

[51] Int. Cl.$^6$ ........................................... G06F 13/14
[52] U.S. Cl. ..................... 710/113; 710/107; 710/111; 710/120; 710/241; 710/243
[58] Field of Search ..................... 395/284–287, 395/290–298, 308, 842, 845, 304–305, 726, 728, 731–732; 710/120

[56] References Cited

U.S. PATENT DOCUMENTS

| | | | |
|---|---|---|---|
| 4,987,529 | 1/1991 | Craft et al. ............................... | 395/842 |
| 5,237,696 | 8/1993 | Best ........................................ | 395/725 |
| 5,301,283 | 4/1994 | Thacker et al. ......................... | 395/293 |
| 5,349,690 | 9/1994 | Frame et al. ............................ | 395/800 |
| 5,392,436 | 2/1995 | Jansen et al. ........................... | 395/725 |
| 5,438,666 | 8/1995 | Craft et al. .............................. | 395/842 |
| 5,506,989 | 4/1996 | Boldt et al. ............................. | 395/732 |
| 5,519,838 | 5/1996 | Ziegler et al. .......................... | 395/299 |
| 5,528,767 | 6/1996 | Chen ....................................... | 395/293 |
| 5,572,686 | 11/1996 | Nunziata et al. ....................... | 395/296 |
| 5,581,782 | 12/1996 | Sarangdhar et al. ............... | 395/800.01 |
| 5,754,777 | 5/1998 | Lee .................................... | 395/200.34 |
| 5,794,073 | 8/1998 | Ramakrishnan et al. ............... | 395/860 |

*Primary Examiner*—Glenn A. Auve
*Assistant Examiner*—Raymond N Phan
*Attorney, Agent, or Firm*—Burns, Doane, Swecker & Mathis, L.L.P.

[57] ABSTRACT

The present invention is directed to providing a computer system which arbitrates control of a shared bus among plural devices included in the computer system. In accordance with the present invention, at least one of the devices is afforded a higher priority than the remaining devices, yet none of the remaining devices are effectively denied system bus access or control for extended periods of time. The present invention can therefore increase operating efficiency even as the number of devices included in the computer system is increased to achieve enhanced processing power. In addition, the present invention can provide sophisticated multimedia features, including real time signal processing, without sacrificing overall operating efficiency. In accordance with the present invention, the plural devices arbitrate system bus control in a manner which achieves acceptable multimedia results when processing real time data streams such as video data streams, audio data streams, animation data streams, and so forth, yet which does not sacrifice the access of remaining devices in the computer system to the shared bus.

22 Claims, 3 Drawing Sheets

METHOD AND APPARATUS FOR ARBITRATION AND ACCESS TO A SHARED BUS

This application is a continuation, of application Ser. No. 08/437,233, filed May 8. 1995, U.S. Pat. No. 5,787,264.

BACKGROUND OF THE INVENTION

1. Field of the Invention

The present invention relates generally to computer system architecture and control, and more particularly to a method and apparatus for arbitrating the access of multiple devices in a computer system to a shared bus of the computer system.

2. State of the Art

As computer systems become increasingly more complex, the manner by which they access and control shared devices becomes a significant factor in maintaining high system throughput and operating efficiency. For example, as the number of devices that share a common bus in a computer system is increased, the computer system must more efficiently arbitrate control of the bus among the devices.

Known techniques for arbitrating access to a shared bus have been deemed acceptable, given the relatively small number of devices and the absence of time critical operations, such as real time signal processing, in conventional computer systems. However, these techniques have effectively limited the number and types of devices which can be connected to the shared bus without affecting processing efficiency. For example, sophisticated multimedia features cannot be included in conventional computer systems without imposing a trade-off in overall operating efficiency of the computer system. This is because computer systems which provide multimedia features must be able to process large quantities of data in real time; for example, real time audio and video data streams.

Conventional techniques for arbitrating control of a shared bus in a computer system are of two general types: (1) those which cannot assign a high priority to a device that performs time critical operations, such as real time signal processing; and (2) those which can assign hierarchical priorities to all devices of the computer system but which, in so doing, allow the higher priority devices to dominate control of the computer system and effectively deny lower priority devices from obtaining control of the shared bus. Currently available arbitration techniques include: (1) first-in/first-out arbitration; (2) "daisy-chaining"; and (3) use of a central arbiter. With first-in/first-out arbitration, individual requests from the plurality of devices sharing a common bus in a computer system are queued in the order in which they arrive at an arbiter of the computer system. Such a scheme ensures equal access among the plurality of devices to the bus so that no one device will be denied access to the bus for an extended period. The disadvantage of first-in/first-out arbitration is that it does not take into account the increasingly more diverse and sophisticated architecture of computer systems, such as multimedia computer systems, wherein the range of features and overall operating efficiency can be enhanced by providing different devices of the computer system different priorities in accessing the shared bus.

Daisy chaining is similar to first-in/first-out arbitration in that a fixed routine is used to arbitrate requests from plural devices of a computer system so that no single device will be denied control of the bus over extended periods of time. With daisy chaining, a bus available signal indicating that the shared bus is available for use is transmitted from one device to the next in a predetermined order. Once a device which is requesting access to the bus receives the bus available signal, that device can access and/or take control of the bus. As with first-in/first-out arbitration, daisy chaining can ensure that all devices will have an opportunity to acquire control of the shared bus. However, this advantage is acquired at the expense of overall operating efficiency when, for example, multimedia features are provided. For example, a relatively low level device which could process data at a later time can be awarded control of the bus even though a real time signal is being received which requires immediate attention.

Computer systems which use a central arbiter to arbitrate access to a shared bus among a plurality of devices typically afford each device requesting access to the bus a given hierarchical priority. This priority can be determined on the basis of predetermined criteria, such as: (1) the importance of the operation to be executed by the device, relative to those of other devices; and (2) the time which the device has been waiting to gain control of the shared bus. Using the priority of each device requesting control of the shared bus, the central arbiter will queue the various requests from the plural devices. This queuing of requests can, of course, be reconfigured each time a new request is received.

An advantage to the use of a central arbiter is that the plurality of devices included in a computer system can be attributed varying priorities in gaining access to and control of a shared bus, such that drawbacks associated with first-in/first-out arbitration and daisy chaining are avoided. However, prioritization techniques based on the use of a central arbiter can be relatively complex and can often result in one or more lower priority devices of the computer system being effectively denied access to the shared bus for extended periods of time. For example, the possibility that one or more devices would be denied control of the bus is quite high in multimedia based systems, wherein devices which execute real time operations can dominate system bus control; when these highest priority devices are idle, system bus control is awarded to the next lower priority devices. Only when all other devices are idle do the very lowest priority devices, acquire system bus control. Accordingly, the very lowest level devices would have great difficulty ever obtaining system bus control. Thus, while the use of a central arbiter overcomes the drawbacks of first-in/first-out arbitration and daisy chaining, it suffers the drawback of effectively denying bus system control to some devices.

Accordingly, it would be desirable to provide a computer system wherein the control of a shared bus by a plurality of devices included in the computer system is provided in a manner whereby overall operating efficiency is enhanced without effectively denying one or more devices in the computer system from control of the bus for extended periods of time. Further, it would be desirable to provide a computer system wherein such enhanced operating efficiency can be achieved even with an increased number of devices included in the computer system having access to the shared bus. Further, it would be desirable to provide enhanced operating efficiency in a computer system which provides sophisticated multimedia features, such as real time audio/video data processing, animation and so forth.

SUMMARY OF THE INVENTION

The present invention is directed to providing a computer system which arbitrates control of a shared bus among plural devices included in the computer system. In accordance with the present invention, at least one of the devices is afforded a higher priority than the remaining devices, yet none of the remaining devices are effectively denied system bus access or control for extended periods of time. The present invention can therefore increase operating efficiency even as the number of devices included in the computer system is increased to achieve enhanced processing power. In addition, the present invention can provide sophisticated multimedia features, including real time signal processing, without sacrificing overall operating efficiency. In accordance with the present invention, the plural devices arbitrate system bus control in a manner which achieves acceptable multimedia results when processing real time data streams such as video data streams, audio data streams, animation data streams, and so forth, yet which does not sacrifice the access of remaining devices in the computer system to the shared bus.

In accordance with exemplary embodiments of the present invention, at least one device performs time-critical operations such as inputting/outputting serial or real time data streams, and can request relatively immediate bus system control via a dedicated signal line. The remaining devices are lower-priority devices which can request the system bus control via an equal access arbitration scheme whereby all of the lower priority devices have an equal chance of acquiring system bus control, and via the use of standard bus request lines. In an absence of a signal on the dedicated signal line from the at least one device, system bus control is awarded to one of the lower level devices using the equal access arbitration scheme.

In accordance with exemplary embodiments, a computer system for processing data includes: a system bus for transferring signals within said computer system; a plurality of devices of a first priority, each of said devices of first priority generating a first signal to request control of said system bus; at least one device of a second priority for generating a second signal to request control of said system bus; and an arbiter responsive to said first signal from each of said plurality of devices of first priority, and to said second signal from said at least one device of second priority, for arbitrating control of said system bus among said plurality of devices of first priority using equal access arbitration in an absence of detecting said second signal and, upon detecting said second signal, granting control of said system bus to said at least one device of second priority.

Further, exemplary embodiments are directed to a method for processing data in a computer system which includes multiple devices connected with a common system bus, comprising the steps of: assigning a first plurality of devices included in said computer system a first priority, each of said plurality of devices generating a first signal to request control of said system bus; assigning at least one additional device included in said computer system a second priority, said at least one additional device generating a second signal to request control of said system bus; and controlling access to said system bus among said first plurality of devices and said at least one device, said step of controlling, further including the steps of: arbitrating control of said system bus among said plurality of devices of first priority using equal access arbitration in an absence of said second signal; and granting control of said system bus to said at least one device of second priority upon detecting said second signal.

BRIEF DESCRIPTION OF THE DRAWINGS

These and other features and advantages of the invention will be readily apparent to those skilled in the art from the following written description, when read in conjunction with the drawings, in which.

DETAILED DESCRIPTION OF THE
PREFERRED EMBODIMENT

Figure 1:
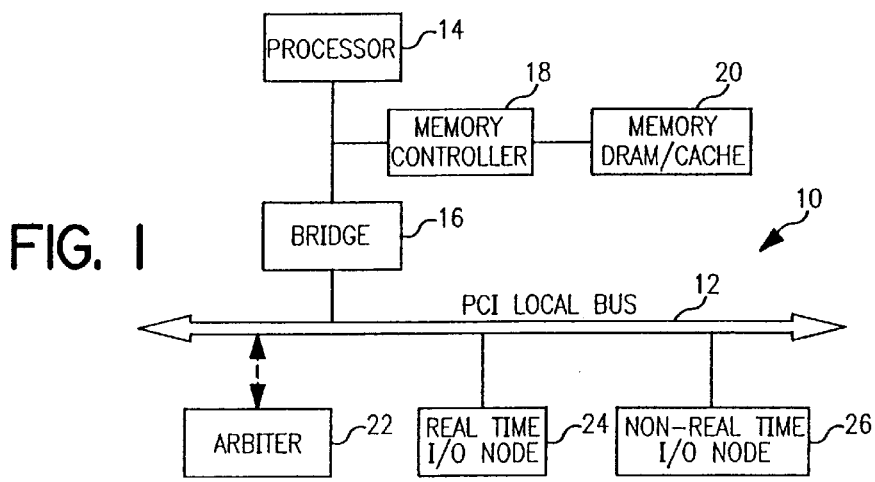
FIG. 1 illustrates an exemplary embodiment of a computer system with a plurality of devices attached to a high performance bus.

FIG. 1 illustrates a computer system for processing data, the computer system having a plurality of devices which communicate over a shared system bus 12. In the exemplary FIG. 1 embodiment, the system bus which is used to transfer signals can be, for example, a Peripheral Component Interconnect (PCI) local bus. A PCI Local Bus is described in "PCI Local Bus Specification," Review Draft Revision 2.1, published Oct. 21, 1994, by PCI Special Interest Group, the disclosure of which is hereby incorporated by reference in its entirety. However, it will be appreciated by those skilled in the art that the present invention is not limited to a PCI local bus, but can be used with any high performance bus for interconnecting plural devices, such as highly integrated peripheral control devices, peripheral add-on boards, processor/memory devices and so forth.

As illustrated in FIG. 1, a plurality of devices are illustrated which can request control of the system bus 12 to read or write data from or to another device. For purposes of the following discussion, any device which can request access to or control of the system bus 12 will be referred to as a bus master device. Those skilled in the art will appreciate that any other devices which do not request system bus control can also be connected to the system bus 12. As illustrated in FIG. 1, the plurality of bus master devices can include, but is not limited to, a processor 14 and associated processor bridge 16, a real time input/output (I/O) device 24, and a non-real time I/O device 26.

The processor bridge 16 allows a processor 14, such as the main processor of a computer system, to access the other devices connected to the PCI bus. One example of this type of access is when the processor 14 performs read or write operations to registers that are contained in either the real time I/O device 24 or the non-real time I/O device 26. The processor bridge 16 also allows either of the I/O devices 24 and 26 to access a system memory 20 via a memory controller 18 in known manner.

According to exemplary embodiments of the present invention, each of a plurality of the devices is assigned a first priority. At least one additional device is assigned a second priority. According one embodiment of the present invention, the bus master device assigned the second priority is the bus master device which handles user specified priority operations, such as time critical processing of serial or real time data streams, including video data streams, audio data streams, animation data streams, and so forth. The operations assigned second priority operations are typically operations which need special attention by the computer system, such as real time transfers of data which should not be interrupted for a given period of time.

For example, if a video data stream is being transferred from an external device through the computer system to a display screen, interruptions in the transfer of the video data stream to the computer system will be noticeable to an observer of the display screen. In the exemplary embodiment of FIG. 1, the real time I/O device 24 is therefore designated as the bus master device of second priority. In the exemplary FIG. 2 embodiment, the real time input/output device 24 is represented as a video input direct memory access (DMA) controller 31 which serves as the bus master device of second priority. The other bus master devices shown, namely the processor bridge 16 and the non-real time I/O device 26, are assigned the first lower priority since they are not performing time critical operations; rather, the devices of the first lower priority can, for example, perform any non-real time operation.

The protocol for gaining control of the system bus is termed arbitration and is overseen by an arbiter means, represented as an arbiter 22, for arbitrating control of the system bus among the plurality of devices of first priority and the at least one device of second priority. It will be appreciated by those skilled in the art, that the arbiter 22 can be located anywhere throughout the computer system. The arbiter 22 has a plurality of request lines 28 coming in from the bus master devices and a plurality of grant lines 30 which are each connected to one of the bus master devices. The arbiter can, in accordance with an exemplary embodiment, include a processor 23 for performing the various arbitration functions based upon one or more user configurable arbitration schemes. Those skilled in the art will appreciate that conventional programming techniques can be used to program the arbiter to implement the functionality described herein.

Figure 2:
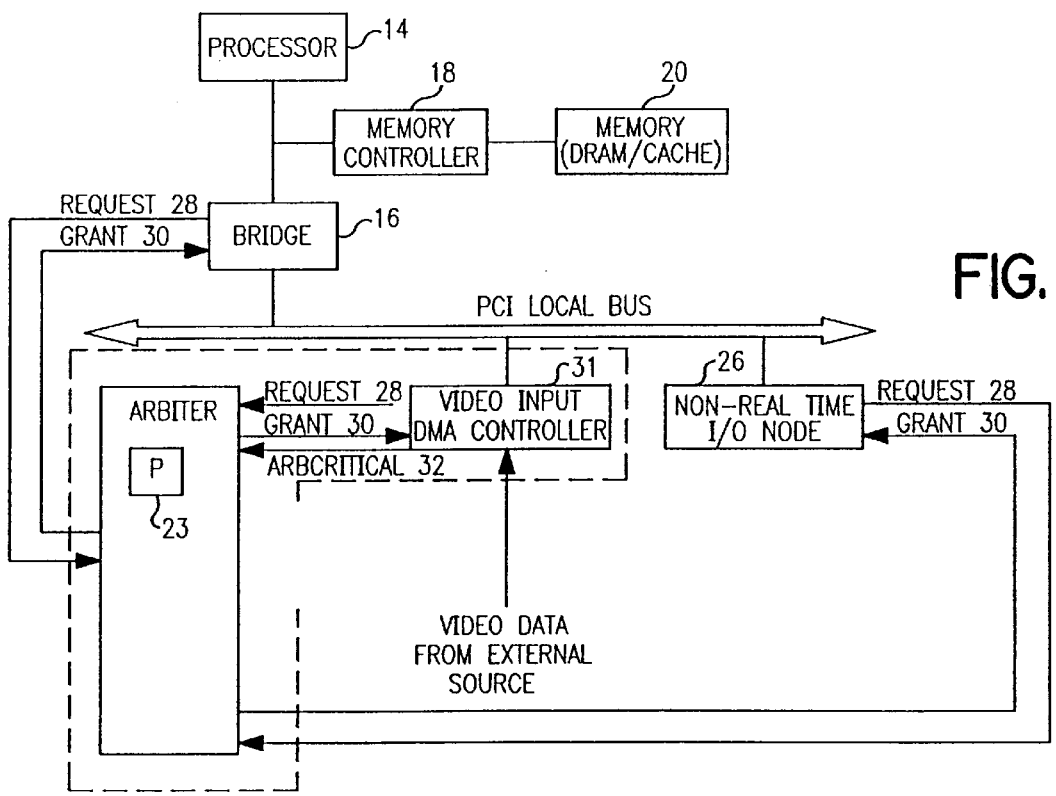
FIG. 2 illustrates a computer system according to an exemplary embodiment of the present invention.

According to the exemplary embodiment illustrated in FIG. 2, the arbiter 22 is responsive to a first signal from each of the plurality of devices of first priority and to a second signal from the at least one device of second priority to arbitrate control of the system bus. The arbiter 22 is, in an exemplary embodiment, connected to each of the bus master devices by the request line 28 and by a grant line 30. Those skilled in the art will appreciate that a single bi-directional line can alternately be used, if desired, for the request and grant signals. According an exemplary embodiment of the present invention, the bus master devices of first priority can request control of the system bus by asserting their request lines 28. If the arbiter grants the request, the arbiter sends a grant signal to the requesting bus master device. In order to ensure that all of the bus master devices of first lower priority have an equal opportunity to use the bus, the arbiter uses an equal access arbitration scheme. For example, a round robin arbitration scheme which awards system bus control to each of any user-specified bus master devices of first priority in a fixed, sequential order, can be used as an equal access arbitration scheme. Alternately, any arbitration scheme which ensures equal access among the bus master devices, such as token ring protocol, can be used as well.

Each bus master device of first priority is only granted a user-configurable limited period of time to control the bus with each request signal. As a result, if a given bus master device of first priority can not complete the number of operations associated with a given transaction within the limited period of time it has been assigned the bus, the given bus master device will have to make another request which will eventually be granted by the arbiter 22 pursuant to the round-robin arbitration scheme. The limited period of time can be configured by the user to take criteria such as the number of devices connected to the system bus into account.

Figure 3:
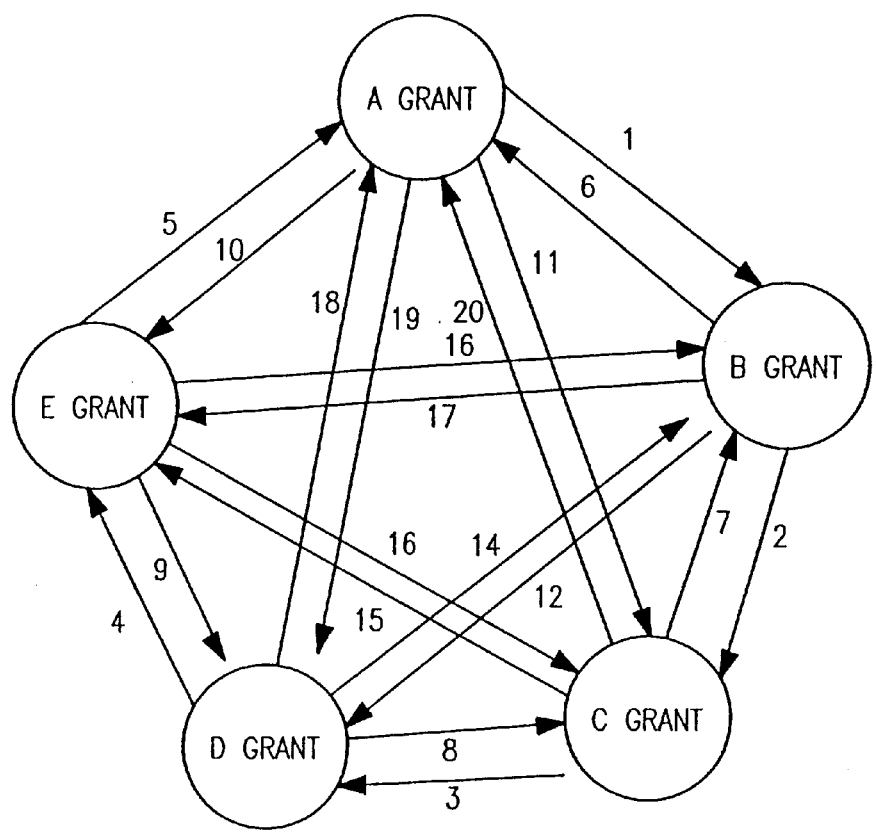
FIG. 3 illustrates an equal access arbitration scheme according to an exemplary embodiment of the present invention.

A possible arbitration scheme is illustrated in FIG. 3 which has five bus master devices labelled A–E of first priority. As illustrated in FIG. 3 by arrows 1–5, if all five of the bus master devices of first priority are requesting access to the bus, the arbiter first grants access to bus master device A followed in sequence by bus master devices B,C,D, and E. If all of the non-priority bus master devices keep requesting the bus, the arbiter will continue to grant access in this rotating, fixed sequence, fashion. However, should a given one of the bus master devices A–E not request access to or control of the bus at the time the arbiter would otherwise offer control to that given bus master device, the arbiter simply skips that bus master device and offers system bus control to the next sequential bus master device which has asserted its bus request signal.

For example, if only bus master devices A and B are requesting access, the arbiter will rotate access to the bus just between the non-priority bus master devices A and B as illustrated by arrows 1 and 6. Furthermore, if bus master devices A, C, and E are requesting access to the bus, the arbiter will rotate access to the bus between bus master devices A, C, and E as illustrated by arrows 11, 13, and 5. Thus, a fixed rotational sequence is used to sequentially grant system bus control among only those bus master devices of first priority which are asserting their bus request signal.

In addition to the request line 28 and the grant line 30, the bus master device of second priority also has an arbitration critical line 32 (labelled ARBcrit in FIG. 2) connected to the arbiter 22. In an exemplary embodiment, when the bus master device of second priority wants control of or access to the system bus, the bus master device of second priority asserts its request line as well as the ARBcrit line. Upon receiving the request and ARBcrit signals, the arbiter then grants control of the bus to the bus master device of second priority without regard to the equal access arbitration scheme.

According to an exemplary embodiment, the bus master device of second priority can keep control of the bus for as long as the bus master device of second priority asserts the ARBcrit signal. In other words, the ARBcrit signal blocks, or inhibits, the arbiter 22 from terminating control of the bus by the bus master device of second priority at the end of the user-configurable limited period of time normally granted to a requesting bus master device. As a result, the bus master device of second priority can perform all of the necessary operations for completing transfer of serial or real time data streams without losing control of the bus.

According to an exemplary embodiment of the present invention, the arbiter 22 can immediately grant control of the bus to the bus master device of second priority. In alternate embodiment, the arbiter 22 can delay the grant for a predetermined period of time, for example, at least a sufficient amount of time for the bus master device currently in control of the bus to complete the single instruction it is currently executing and buffer status information. For example, the delay can be set to three or more clock cycles in an exemplary embodiment. This delay gives a bus master device of first priority presently using the bus an opportunity to complete a current operation before the bus master device of second priority is granted control of the bus, and thereby avoids the bus master device of first priority from entering a deadlock situation.

Figure 4:
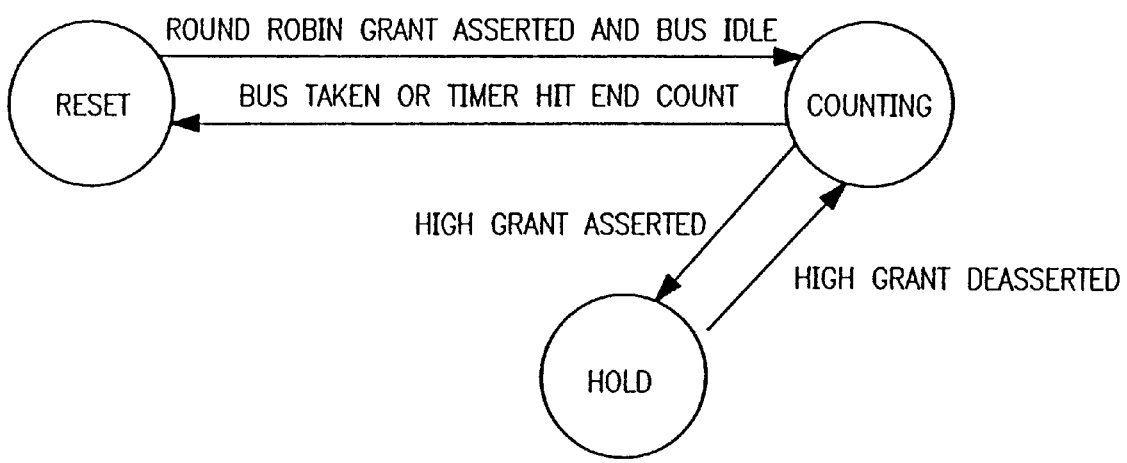
FIG. 4 illustrates an arbitration method according to an exemplary embodiment of the present invention.

According to an exemplary embodiment of the present invention as described above, bus masters of first priority can be guaranteed an opportunity to complete one transaction (for example, a transaction including one or more instructions) when granted control of the bus for the predetermined limited period of time, assuming that the ARBcrit signal is not asserted. This ensures that the remaining bus master devices of first priority are offered a fair chance to use the bus. As illustrated in FIG. 4, if a -bus master device of first priority receives a grant from the arbiter to take control of the system bus, the bus master device granted control has a predetermined period of time during which it can take control of the bus. Again, this predetermined period of time is user-configurable. In the exemplary FIG. 2 embodiment, this predetermined period can be a value on the order of 16 clock cycles of the idle time as defined by the PCI Local Bus specification and the current count can be tracked with a counter.

More particularly, idle time can be defined as the IRdy and Frame signals being deasserted (high) in accordance with PCI bus protocol. If the bus master device of second priority requests control of the bus during this period of time, the bus master device of second priority is granted access to the bus. In this case, the arbiter can, if desired, be configured to hold, or store, a count representing the elapsed idle time of a bus master device previously granted control of the system bus until the bus master device of second priority releases control of the bus. Then, the incrementing of the count resumes where it left off and continues to the predetermined value. If the count reaches the predetermined value, an internal state bit in the arbiter can be set to indicate that the bus master device of first priority is attempting to hold the bus. This bit allows the arbiter to advance to the next requesting bus master device of first priority without allowing a transaction from bus master device previously granted system bus control.

Figure 5:
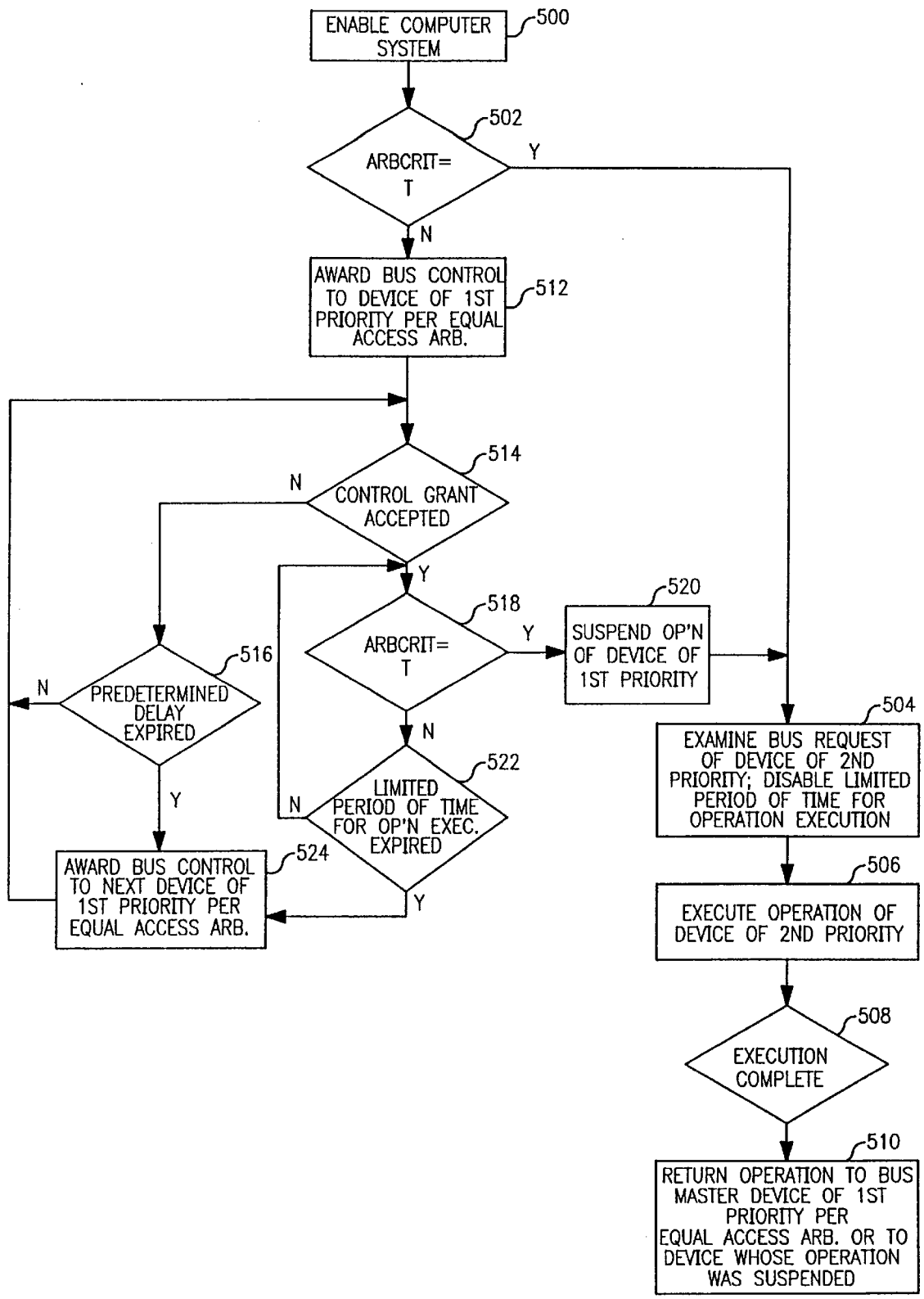
FIG. 5 illustrates an exemplary flowchart relating to an arbitration method in accordance with the present invention.

FIG. 5 illustrates an exemplary flowchart of an operation associated with the exemplary embodiment illustrated in FIG. 2. In FIG. 5, the computer system is enabled at block 500. The ARBcrit signal is examined in decision block 502 to determine whether the bus master device of second priority has requested system bus control. If so, operation proceeds to block 504 wherein the bus request line of the bus master device of second priority can be examined. Further, the predetermined limited period of time for executing an operation can be disabled so that the bus master of second priority can retain operation of the system bus for as long as the ARBcrit signal is asserted.

In block 506, the bus master device of second priority executes operations, such as time-critical operations. Decision block 508 represents an examination of the ARBcrit signal to determine whether the bus master device of second priority has completed executing its time-critical operations. If not, the bus master device of second priority is permitted to complete such operations. However, if such operations are complete, flow returns via block 510 to the bus master device of first priority which had previously been in control of the system bus at the time the ARBcrit signal was asserted. Of course if the ARBcrit signal was asserted at power up (i.e., block 502), system bus control is supplied to the first bus master of first priority which is to receive control pursuant to the equal access arbitration scheme.

Returning to the decision block 502, if the ARBcrit signal was not asserted at the time the system was enabled, then the arbiter will award priority to the first bus master of first priority in accordance with the equal access arbitration scheme in block 512. In block 514, it is examined whether the bus master selected by the arbitration scheme has accepted the grant of the system bus. If not, decision block 516 examines whether the predetermined time delay has expired. If so, operation flows to block 524 to select the next bus master of first priority pursuant to the equal access arbitration scheme.

Returning to decision block 514, assuming that the bus master device of first priority selected by the arbiter has been granted control of the system bus, and that the bus master device has accepted such control, the ARBcrit signal is monitored in decision block 518. Again, if the ARBcrit signal becomes true at any time while another bus master device of first priority is in control of the bus, operation proceeds to block 520 wherein operation of the bus master device of first priority is suspended, and operation flows to blocks 504–510.

Assuming that the ARBcrit signal has not been asserted in block 518, operation flows to decision block 522 wherein the predetermined, limited period of time during which a bus master device of first priority can execute control of the system bus is monitored. Provided this period has not expired, monitoring of the ARBcrit signal and the predetermined, limited period of time continue. However, once the pre-determined, limited period of time has expired, operation of the bus master device of first priority currently in control of the system bus is terminated, and operation returns to block 524, wherein the next bus master device of first priority is selected pursuant to the equal access arbitration scheme.

Those skilled in the art will appreciate that the present invention is not limited to the exemplary embodiments described above. For example, those skilled in the art will appreciate that the bus master device of second priority need not include a separate request line and a separate arbitration critical line, but that an arbitration critical line alone can be used. In this case, the ARBcrit signal can both serve as a request signal and as an inhibit signal for inhibiting the limited period of time afforded the bus master devices of first priority to retain system bus control in response to a single bus request signal.

Further those skilled in the art will appreciate that the computer system of FIG. 3 can be configured such that the bus master device of second priority executes both time-critical (for example, real time) signal processing operations and non-real time operations. In the case of non-real time operations, the bus master device of second priority can request access to the system bus using its request line, and can be awarded system bus control via the equal access arbitration scheme. However, in the case of real time operations, system bus control can be acquired via use of the arbitration critical line.

In addition, those skilled in the art will appreciate that while each bus request line is illustrated as a hardwired input to an input port of the arbiter, these inputs can be configured and reconfigured by the user in any desired order. Alternately, a reconfiguring of order can be achieved using software reassignment of the input ports to the arbiter.

Further, those skilled in the art will appreciate that the limited period of time, as well as any predetermined time periods or values described above, can be configured and reconfigured by the user at any time. For example, as additional devices are added to the computer system the limited period of time can be reduced.

Those skilled in the art will also appreciate that although the exemplary FIG. 1 embodiment has been described as including a single real time input/output device 24, any number of such devices can be included in the computer system. Where more than one real time device is included in the computer system, the request lines from all such devices can be used to assert the ARBcrit signal. That is, when any of the real time devices asserts a request to control the bus, the ARBcrit signal is asserted. To accommodate a situation where more than one real time device has asserted a request for bus control, an arbitration scheme, separate from the equal access arbitration scheme associated with non-real time devices, can be used to award system bus control to one of the real time devices.

For example, each of the real time devices can be afforded a hierarchical priority as a function of the bandwidth associated with signals processed by that device. More particularly, a device associated with a high bandwidth video signal can be afforded highest priority. A device associated with a mid-bandwidth audio signal can be afforded a lower priority. Another device used to process real time serial data streams can be afforded a next lower priority.

The priority of a real time device requesting system bus control can be identified by an input/output device which is either separate from or included within the arbiter. As a result, upon requesting system bus control, the ARBcrit line will be serviced by the arbiter to award system bus control to the highest priority real time device currently requesting bus control.

If more than one real time device is currently requesting system bus control, then the highest priority device is awarded system bus control first. After the operations of that device are complete, the ARBcrit signal remains asserted, and the next lower priority real time device is awarded system bus control. This process is repeated until all real time devices have completed their operations, and the ARBcrit signal has been deasserted.

Those skilled in the art will appreciate that in place of a hierarchical priority scheme, any arbitration scheme can be used to award priority to one of the real time devices. Further, those skilled in the art will appreciate that multiple arbitration schemes can be used to service the real time devices. For example, multiple devices for processing video signals, can be collectively designated the highest priority devices, and then awarded system bus control in a round robin format. After all such devices have finished their operations, system bus control can be awarded to the next lower priority device or devices.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A computer system for processing data comprising:
    a system bus for transferring signals within the computer system;
    a plurality of first priority devices for generating a first signal to individually request control of the system bus with the first priority;
    at least one variable priority device for generating a second signal to request control of the system bus with a second priority and for generating the first signal to request control of the system bus with the first priority; and
    an arbiter responsive to the first and second signals for arbitrating control of the system bus among devices generating the first signal using an equal access arbitration in an absence of detecting the second signal and, upon detecting the second signal, granting control of the system bus to the at least one variable priority device generating the second signal.

2. A computer system according to claim 1, wherein ones of the devices generating the first signal are granted access to the system bus in a round-robin format.

3. A computer system according to claim 2, wherein ones of the devices generating the first signal are granted control of the system bus for a limited period of time in response to each request for system bus control.

4. A computer system according to claim 1, wherein when the at least one variable priority device generates the second signal, the at least one variable priority device is granted control of the system bus for as long as the second signal remains asserted.

5. A computer system according to claim 1, wherein when the arbiter grants system bus control to one of the devices generating the first signal, the one device has a predetermined period of time in which to acquire control of the system bus following the grant of system bus control.

6. A computer system according to claim 5, wherein an elapsed period of time subsequent to the grant of system bus control to the one device is stored while the at least one variable priority device uses the system bus with the second priority.

7. A computer system according to claim 6, wherein after the at least one variable priority device using the system bus with the second priority releases system bus control and system bus control is again granted to the one device, the stored elapsed period of time is incremented.

8. A computer system according to claim 1, wherein the arbiter waits a predetermined period of time before granting bus access to the at least one variable priority device after a request with the second priority by the at least one variable priority device.

9. A computer system according to claim 8, wherein the arbiter waits a predetermined number of clock cycles before granting bus access in response to a request with the second priority.

10. A computer system according to claim 1, wherein the at least one variable priority device is a video input device.

11. A computer system according to claim 1, wherein the at least one variable priority device comprises a plurality of variable priority devices, and the second signal is generated in response to a request with the second priority from any of the plurality of variable priority devices to control the system bus.

12. A computer according to claim 11, wherein the arbiter awards control of the system bus to one of the plurality of variable priority devices using hierarchical arbitration.

13. Method for processing data in a computer system which includes multiple devices connected with a common system bus, comprising the steps of:
    assigning a plurality of first priority devices included in the computer system a first priority, each of the plurality of first priority devices generating a first signal to request control of the system bus;
    assigning at least one variable priority device included in the computer system a variable priority, wherein the at least one variable priority device generates a second signal to request control of the system bus with a second priority and generates the first signal to request control of the system bus with the first priority; and
    controlling access to the system bus among the first priority devices and the at least one variable priority device, the step of controlling further including the steps of:

arbitrating control of the system bus among the devices generating the first signal using equal access arbitration in an absence of the second signal; and granting control of the system bus to the at least one variable priority device upon detecting the second signal.

14. Method according to claim 13, wherein the at least one variable priority device performs time-critical operations.

15. Method according to claim 13, wherein the at least one variable priority device is a video input device.

16. Method according to claim 13, wherein the devices generating the first signal have a predetermined period of time in which to act upon a system bus grant.

17. Method according to claim 13, wherein the devices requesting control of the system bus with the first priority are granted control of the system bus for a limited period of time in response to each request for system bus control.

18. Method according to claim 16, further including a step of:

storing an elapsed period of time during which one of the devices that requested control of the system bus with the first priority has been granted system bus control, while the at least one variable priority device uses the system bus after having been granted system bus control in response to a second priority request.

19. Method according to claim 18, further including a step of:

incrementing the elapsed period of time after the at least one variable priority device releases system bus control and system bus control is again granted to the one of the devices.

20. Method according to claim 13, further including a step of:

waiting a predetermined period of time before granting bus access in response to a request of the second priority.

21. Method according to claim 13, further comprising a steps of:

assigning a plurality of additional devices included in the computer system the variable priority; and generating the second signal in response to a request for system bus control by any of the plurality of additional devices.

22. Method according to claim 21, further including a step of:

arbitrating control of the system bus among the plurality of additional devices using hierarchical arbitration.

* * * * *

UNITED STATES PATENT AND TRADEMARK OFFICE
CERTIFICATE OF CORRECTION

PATENT NO. : 5,983,302  
DATED : November 9, 1999  
INVENTOR(S) : Kevin M. Christiansen, Mark A. Stubbs and Bruce Eckstein Page 1 of 1

It is certified that error appears in the above-identified patent and that said Letters Patent is hereby corrected as shown below:

<u>Title page,</u>
Item [73], replace "Apple Comptuer" with -- Apple Computer --.

Signed and Sealed this

Twenty-first Day of May, 2002

*Attest:*

*Attesting Officer*

JAMES E. ROGAN
*Director of the United States Patent and Trademark Office*